United States Patent
Yun (10) Patent No.: US 10,759,267 B2
(45) Date of Patent: Sep. 1, 2020

(54) HYBRID VEHICLE AND TRANSMISSION CONTROL METHOD THEREOF

(71) Applicants: Hyundai Motor Company, Seoul (KR); Kia Motors Corporation, Seoul (KR)

(72) Inventor: Young Min Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/401,351

(22) Filed: May 2, 2019

(65) Prior Publication Data

US 2020/0180424 A1 Jun. 11, 2020

(30) Foreign Application Priority Data

Dec. 7, 2018 (KR) .......................... 10-2018-0157528

(51) Int. Cl.
*B60K 6/54* (2007.10)
*B60W 20/30* (2016.01)

(52) U.S. Cl.
CPC ............... *B60K 6/54* (2013.01); *B60W 20/30* (2013.01); *B60K 2006/541* (2013.01)

(58) Field of Classification Search
None
See application file for complete search history.

(56) References Cited

U.S. PATENT DOCUMENTS

| | | | |
|---|---|---|---|
| 6,409,623 B1 * | 6/2002 | Hoshiya | B60K 6/365 |
| | | | 475/5 |
| 9,358,892 B1 * | 6/2016 | Gaither | B60K 6/365 |
| 9,771,066 B2 * | 9/2017 | Yoon | B60W 10/10 |
| 9,821,797 B2 * | 11/2017 | Yoon | B60W 20/14 |
| 9,937,917 B2 * | 4/2018 | Yoon | B60W 10/113 |
| 10,150,466 B2 * | 12/2018 | Kang | B60W 20/30 |
| 10,350,983 B2 * | 7/2019 | Imamura | B60W 10/06 |
| 10,532,733 B2 * | 1/2020 | Yagi | B60W 20/30 |
| 10,625,592 B2 * | 4/2020 | Imai | B60W 10/115 |
| 2019/0184807 A1 * | 6/2019 | Okamura | B60W 10/08 |

\* cited by examiner

*Primary Examiner* — Dirk Wright
(74) *Attorney, Agent, or Firm* — Morgan, Lewis & Bockius LLP

(57) ABSTRACT

A transmission control method of a hybrid vehicle provided with a transmission having no reverse gear, may include performing a speed control of a motor with a target RPM corresponding to an existing gear step when a shift lever is switched from a drive D to a neutral N; and performing a backward travel with the existing gear step by engaging a gear of the existing gear step with a clutch and applying a reverse torque of the motor to the transmission when the shift lever is switched from the neutral N to a reverse R.

20 Claims, 7 Drawing Sheets

FIG. 4B

# HYBRID VEHICLE AND TRANSMISSION CONTROL METHOD THEREOF

CROSS-REFERENCE TO RELATED APPLICATION(S)

The present application claims priority to Korean Patent Application No. 10-2018-0157528, filed on Dec. 7, 2018, the entire contents of which is incorporated herein for all purposes by this reference.

BACKGROUND OF THE INVENTION

Field of the Invention

The present invention relates to a vehicle, and more particularly, to a hybrid vehicle having a dual clutch transmission.

Description of Related Art

A dual clutch transmission is a transmission with both the efficiency of a manual transmission and the convenience of an automatic transmission. The dual clutch transmission is the same as an automatic transmission in that it does not require the operation of a driver for the shift during travel, but the power transmission efficiency of the dual clutch transmission is relatively high compared to a conventional automatic transmission because its basic principle is based on the manual transmission.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hybrid vehicle and a transmission control method thereof in which a rearward travel may be implemented through the reverse rotation of a motor without a separate reverse gear and appropriate shift control in consideration of the current gear position of the transmission at the time of shifting from the drive D to the reverse R or from the reverse R to the drive D may be performed.

Additional various aspects of the present invention will be set forth in part in the description which follows and, in part, will be obvious from the description, or may be learned by practice of the present invention.

In accordance with an aspect of the present invention, a transmission control method of a hybrid vehicle which is provided with a transmission having no reverse gear may include performing a speed control of a motor with a target RPM corresponding to an existing gear step when a shift lever is switched from a drive D to a neutral N, and performing a backward travel with the existing gear step by engaging a gear of the existing gear step with a clutch and applying a reverse torque of the motor to the transmission when the shift lever is switched from the neutral N to a reverse R.

When the existing gear step is a first step, a speed of the motor is controlled to a first-step target RPM.

When the existing gear step is a second step, the speed of the motor is controlled to any one of the first-step target RPM and a second-step target RPM depending on an inclination of a road on which the vehicle is traveling.

When the inclination of the road is less than a predetermined reference value, the speed of the motor is controlled to the first-step target RPM, and when the inclination of the road is equal to or greater than the predetermined reference value, the speed of the motor is controlled to the second-step target RPM.

The predetermined reference value of the inclination is the maximum inclination at which the vehicle is configured for traveling with a second gear ratio of the transmission.

When the existing gear step is a third step or more, the speed of the motor is controlled after the vehicle speed is reduced below a predetermined reference value.

When the existing gear step is the third step or more, the speed of the motor is controlled to a second-step target RPM.

The transmission is a dual clutch transmission including an odd-step transmission clutch and an even-step transmission clutch, the existing gear step is connected to the odd-step clutch when the existing gear step is an odd-numbered step, and the existing gear step is connected to the even-step clutch when the existing gear step is an even-numbered step.

In accordance with another aspect of the present invention, a transmission control method of a hybrid vehicle which is provided with a transmission having no reverse gear may include performing a speed control of a motor with a target RPM corresponding to an existing gear step when a shift lever is switched from reverse R to neutral N, and performing a forward travel with the existing gear step by engaging a gear of the existing gear step with a clutch and applying a torque of the motor to the transmission when the shift lever is switched from the neutral N to a drive D.

When the existing gear step is a first step, a speed of the motor is controlled to a first-step target RPM.

When the existing gear step is a second step, the speed of the motor is controlled to any one of the first-step target RPM and a second-step target RPM depending on an inclination of a road on which the vehicle is traveling.

When the inclination of the road exceeds a predetermined reference value, the speed of the motor is controlled to the first-step target RPM, and when the inclination of the road is equal to or less than the predetermined reference value, the speed of the motor is controlled to the second-step target RPM.

The predetermined reference value of the inclination is the maximum inclination at which the vehicle is configured for traveling with a second gear ratio of the transmission.

The transmission is a dual clutch transmission including an odd-step clutch and an even-step clutch, the existing gear step is connected to the odd-step clutch when the existing gear step is an odd-numbered step, and the existing gear step is connected to the even-step clutch when the existing gear step is an even-numbered step.

In accordance with another aspect of the present invention, a hybrid vehicle may include a transmission having no reverse gear, and a controller configured of performing a speed control of a motor with a target RPM corresponding to an existing gear step when a shift lever is switched from a drive D to a neutral N and to perform a backward travel with the existing gear step by engaging a gear of the existing gear step with a clutch and applying a reverse torque of the motor to the transmission when the shift lever is switched from the neutral N to a reverse R.

The controller controls the speed of the motor to any one of a first-step target RPM and a second-step target RPM depending on an inclination of a road on which the vehicle is traveling when the existing gear step is a second step.

The controller controls the speed of the motor to the first-step target RPM when the inclination of the road is less than a predetermined reference value and controls the speed of the motor to the second-step target RPM when the inclination of the road is equal to or greater than the predetermined reference value.

The predetermined reference value of the inclination is the maximum inclination at which the vehicle is configured for traveling with a second gear ratio of the transmission.

In accordance with another aspect of the present invention, a hybrid vehicle may include a transmission having no reverse gear, and a controller configured of performing a speed control of a motor with a target RPM corresponding to an existing gear step when a shift lever is switched from a reverse R to a neutral N and to perform a forward travel with the existing gear step by engaging a gear of the existing gear step with a clutch and applying a torque of the motor to the transmission when the shift lever is switched from the neutral N to a drive D.

The controller controls the speed of the motor to any one of a first-step target RPM and a second-step target RPM depending on an inclination of a road on which the vehicle is traveling when the existing gear step is a second step.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
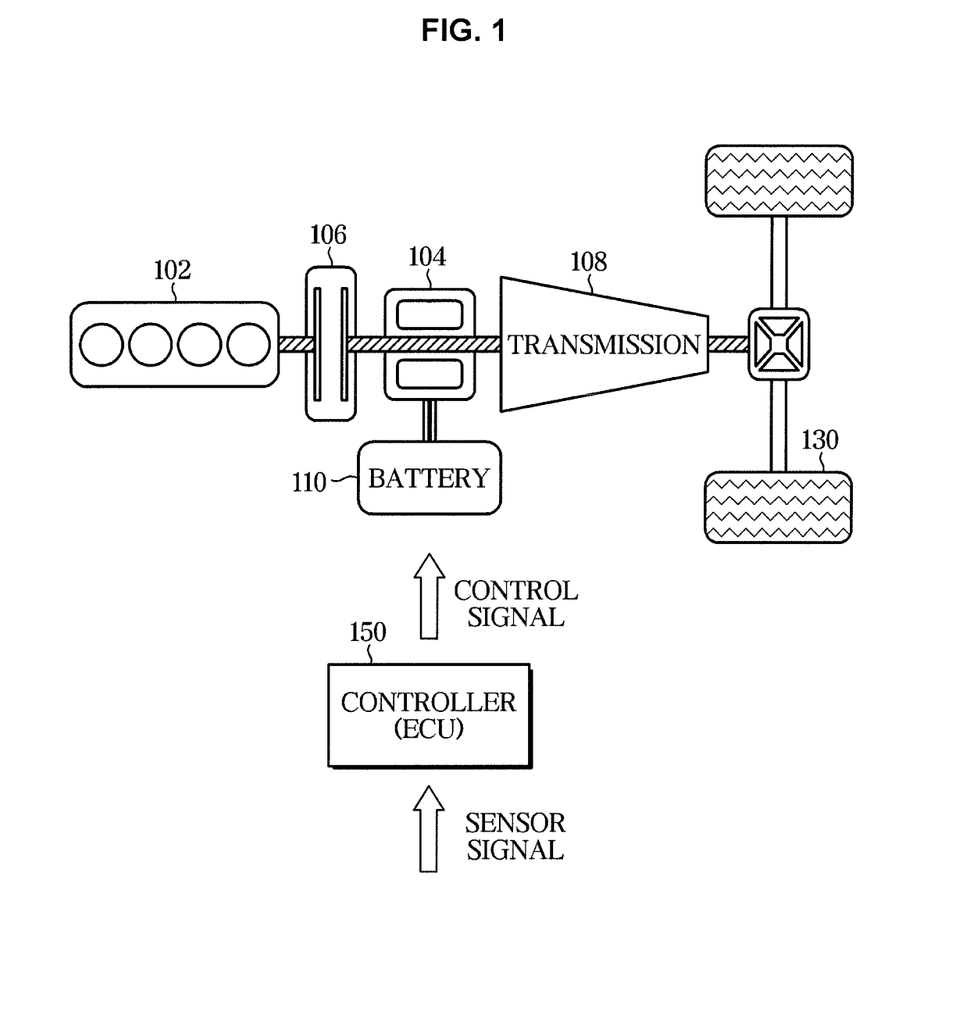
FIG. 1 schematically illustrates a power train system of a vehicle according to an exemplary embodiment of the present invention.

FIG. 1 schematically illustrates a power train system of a vehicle according to an exemplary embodiment of the present invention. The vehicle illustrated in FIG. 1 is a hybrid vehicle using the engine 102 and the motor 104.

The engine 102 is an internal combustion engine that burns fossil fuel to generate power.

The motor 104 generates electric power using electrical energy.

An engine clutch 106 connects or disconnects the engine 102 and the motor 104. In a state in which the engine clutch 106 is released, only the power of the motor 104 is transmitted to a transmission 108 and the power of the engine 102 is not transmitted to the transmission 108. In contrast, when the engine clutch 106 is connected, both the power of the engine 102 and the power of the motor 104 are transmitted to the transmission 108. The engine clutch 106 is distinguished from odd-step and even-step clutches 202 and 232 of the transmission 108, which will be described later with reference to FIG. 2.

The transmission 108 converts the power generated by the engine 102 and the motor 104 to an appropriate rotational force according to the speed to transmit the rotational force to drive wheels 130.

A battery 110 stores electric power for driving the motor 104. The battery 110 may be charged through self-generated power of the vehicle, or may be charged by an external charger.

A controller 150 is an electronic control unit (ECU) that controls overall operation of the power transmission system. For example, the controller 150 allows the vehicle to run smoothly by controlling the operation of the engine 102, the motor 104, the engine clutch 106, the transmission 108, the battery 110, and the like. To the present end, the controller 150 receives sensor signals generated from various types of sensors provided in the vehicle. A control signal output from the controller 150 to control the power transmission system may be generated based on the sensor signals.

Figure 2:
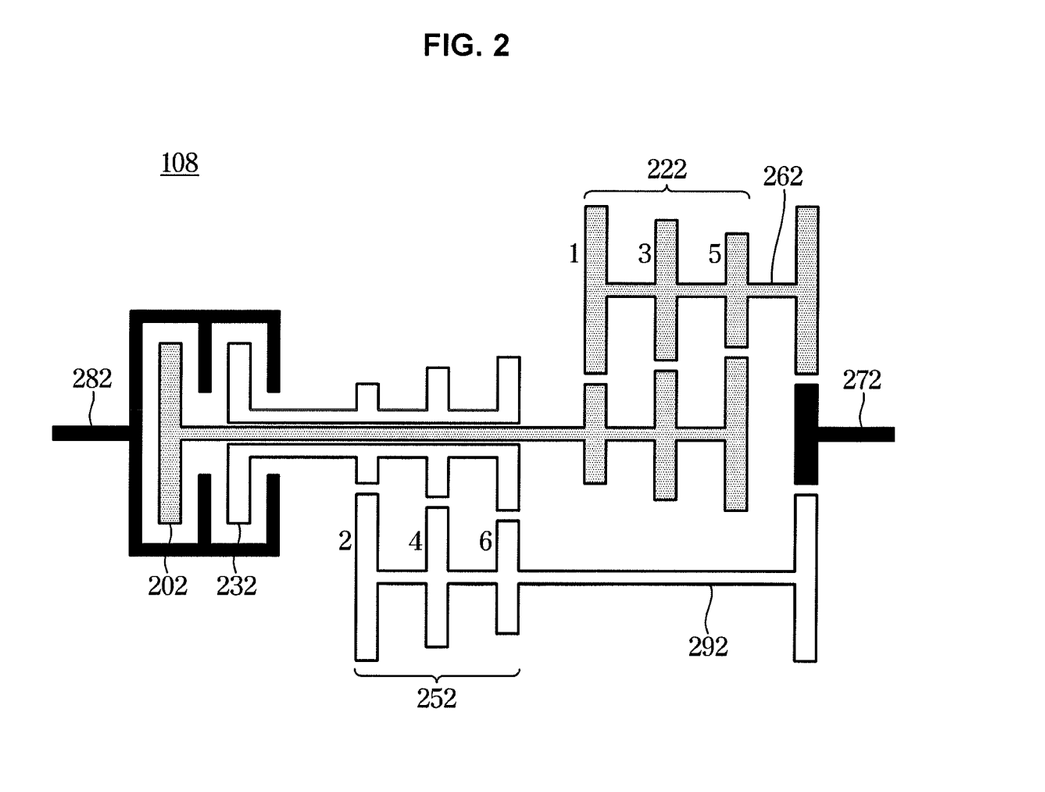
FIG. 2 schematically illustrates a structure of a transmission of a vehicle according to an exemplary embodiment of the present invention.

FIG. 2 schematically illustrates a structure of a transmission of a vehicle according to an exemplary embodiment of the present invention. The transmission 108 illustrated in FIG. 2 is a 6-speed dual clutch transmission.

A dual clutch transmission is a transmission with both the efficiency of a manual transmission and the convenience of an automatic transmission. The dual clutch transmission is the same as an automatic transmission in that it does not require the operation of a driver for the shift during travel, but the power transmission efficiency of the dual clutch transmission is relatively high compared to a conventional automatic transmission because its basic principle is based on the manual transmission.

As illustrated in FIG. 2, the transmission 108 of the vehicle according to an exemplary embodiment of the present invention is a 6-speed dual clutch transmission that includes two clutches of the odd-step clutch 202 and the even-step clutch 232. Odd-step gears (1st, 3rd, and 5th gears) 222 are connected to the odd-step clutch 202 to transmit power, and even-step gears (2nd, 4th, and 6th gears) 252 are connected to the even-step clutch 232 to transmit power. In a conventional transmission with one clutch, only the 3rd-step gear is connected to an output side when the current gear position is in the 3rd step. In contrast, in the dual clutch transmission, when the operation of a shift lever for shifting from the 3rd-step gear to the 2nd-step gear or from the 3rd-step gear to the 4th-step gear occurs in a state where the 2nd-step gear and the 4th-step gear adjacent to the 3rd-step gear are ready to be shifted immediately, an immediate shift from the 3rd-step gear to the 2nd-step gear or from the 3rd-step gear to the 4th-step gear is achieved. Due to the present structure, the transmission speed of the dual clutch transmission is relatively faster than the transmission speed of a conventional automatic transmission.

In FIG. 2, a crankshaft 282 connects the even-step clutch 232 or the odd-step clutch 202 to the engine 102 and the motor 104. A driveshaft 272 transmits the output of the transmission 108 to drive wheels 130. An odd-step output shaft 262 transmits the rotational force of the odd-step gears 222 to the driveshaft 272. An even-step output shaft 292 transmits the rotational force of the even-step gears 252 to the driveshaft 272.

The transmission 108 according to an exemplary embodiment of the present invention which is illustrated in FIG. 2 does not have a separate reverse gear but implements a reverse travel by the reverse rotation of the motor 104. In the case of a vehicle using only the power of an internal combustion engine, since the internal combustion engine cannot be reversed, a separate reverse gear for the reverse travel must be provided in the transmission. In contrast, in the case of a hybrid vehicle using a motor together with the internal combustion engine, since the reverse travel may be realized by use of the reverse rotation of the motor, a reverse gear may not be provided in the transmission, and the reverse travel may be realized by reverse rotation of the motor and coupling of the traveling gears. Removing the reverse gear from the transmission reduces the weight and size of the transmission, which may provide many benefits such as improved vehicle design, improved fuel economy, and simplified power transmission system.

However, in a case where the reverse travel is implemented through the reverse rotation of the motor 104, it is necessary to perform a shift control in consideration of the current gear position of the transmission 108 at the time of shifting from the drive D to the reverse R or at the time of shifting from the reverse R to the drive D. In an exemplary embodiment of the present invention, the reverse travel may be implemented through the reverse rotation of the motor 104 without a separate reverse gear, an appropriate shift control may be performed in consideration of the current gear position of the transmission 108 at the time of shifting from the drive D to the reverse R or at the time of shifting from the reverse R to the drive D.

Figure 3A:
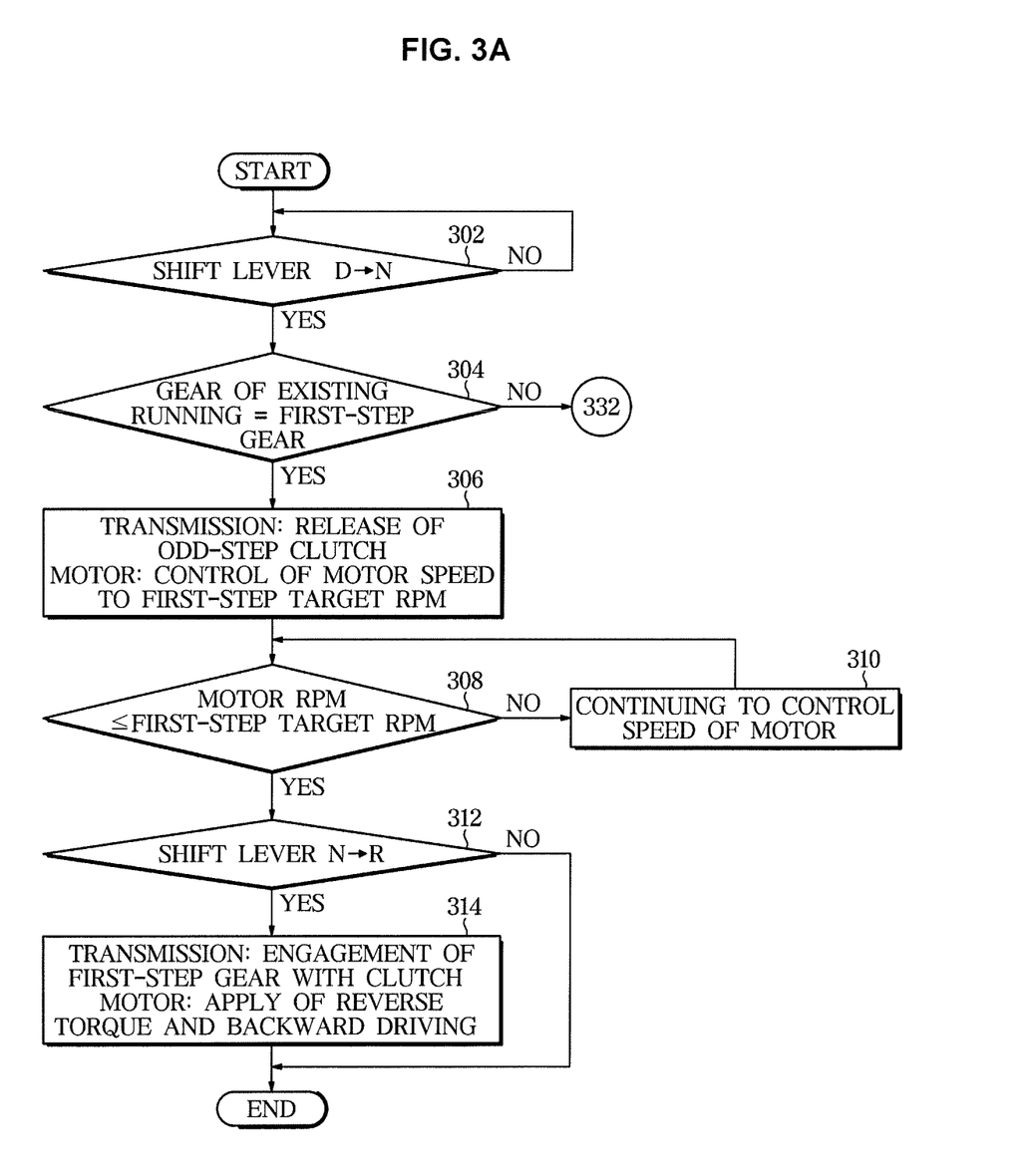
FIG. 3A, FIG. 3B and FIG. 3C are flowcharts illustrating control methods for a reverse shift of a vehicle according to an exemplary embodiment of the present invention.
Figure 3B:
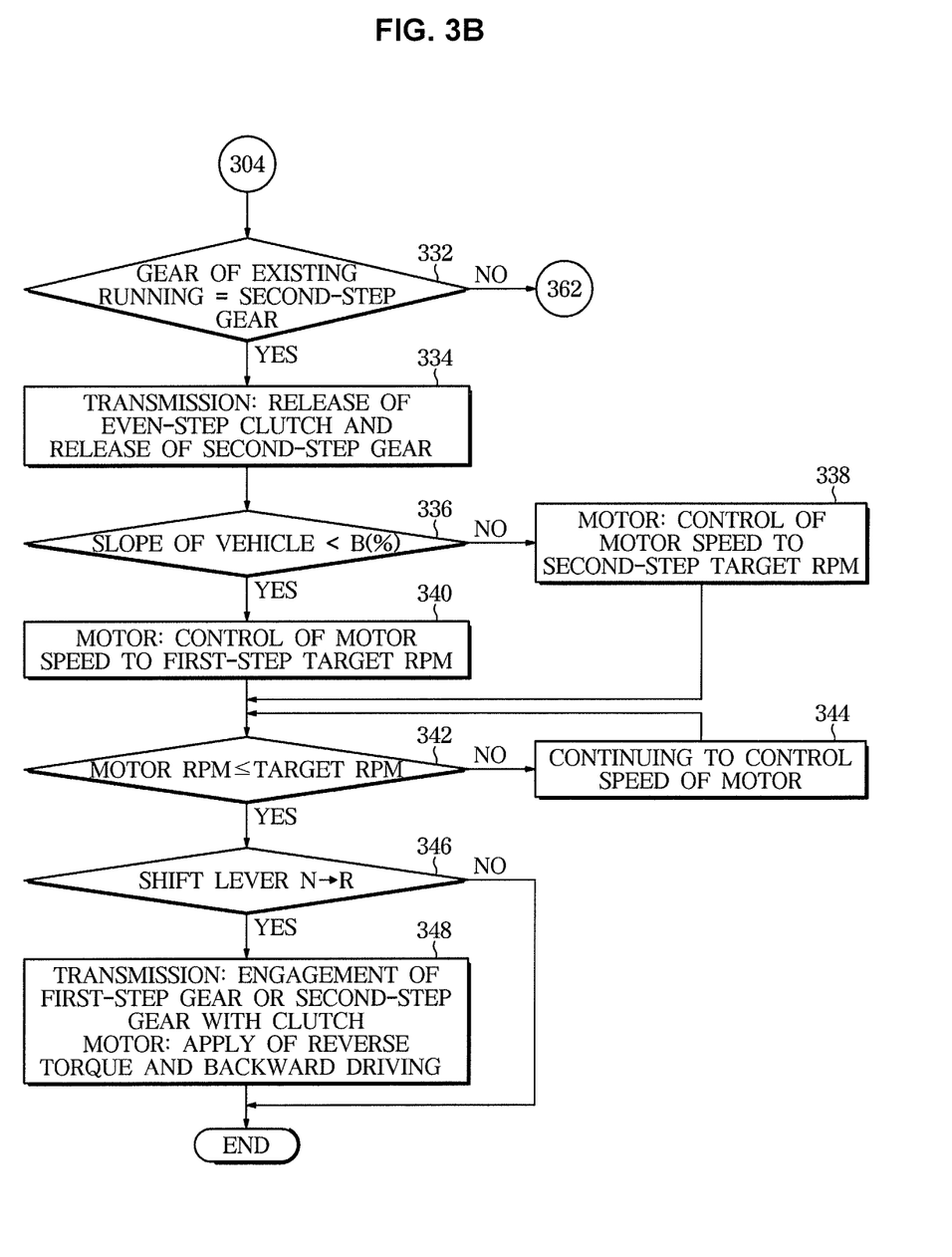
Figure 3C:
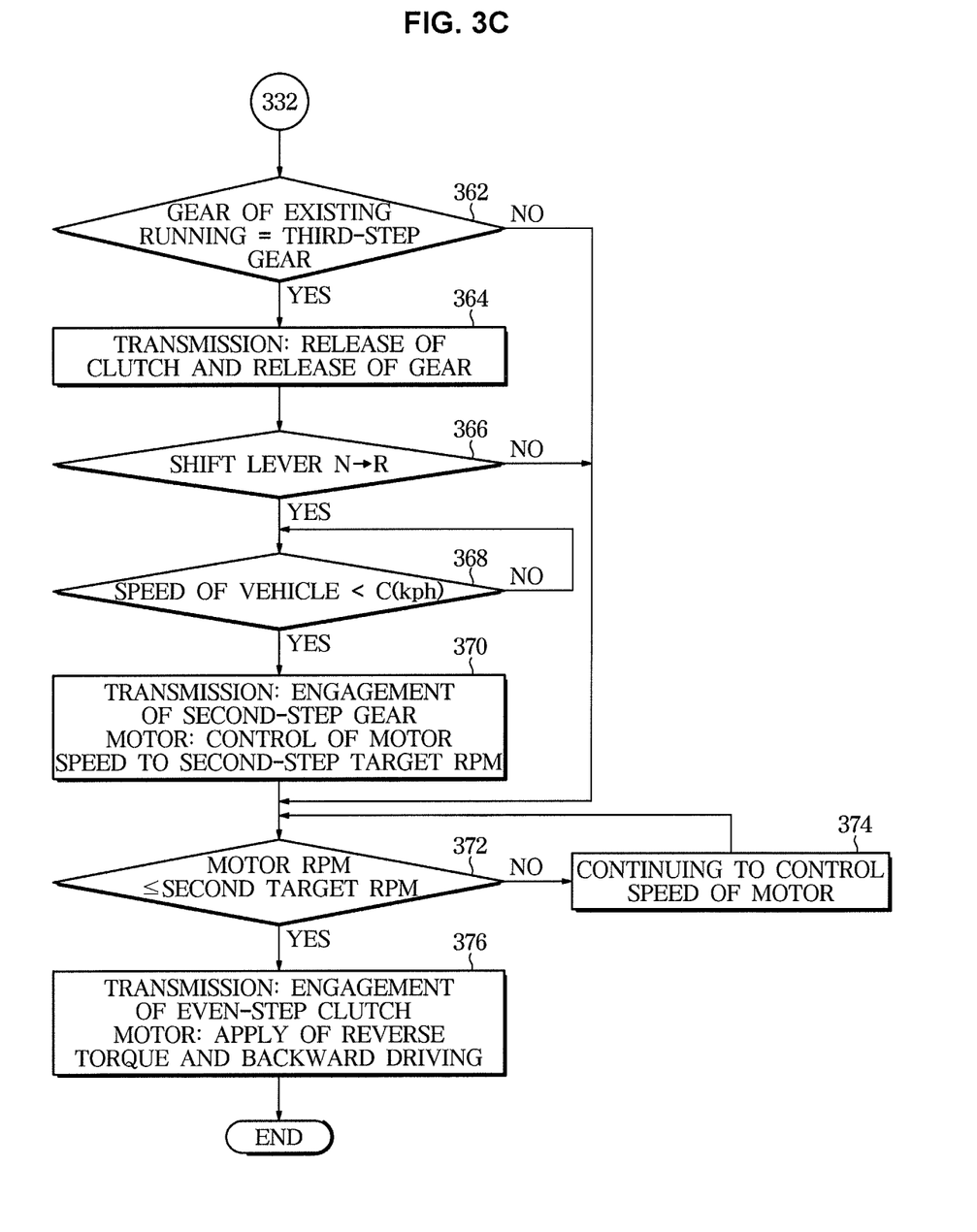

FIG. 3A, FIG. 3B and FIG. 3C are flowcharts illustrating control methods for a reverse shift of a vehicle according to an exemplary embodiment of the present invention. That is, FIG. 3A, FIG. 3B and FIG. 3C illustrate control methods of switching the transmission 108 of the vehicle according to an exemplary embodiment of the present invention from the drive D to the reverse R. FIG. 3A illustrates a control method in which the current gear position of the transmission 108 is switched from a first running step D1 to the reverse R, FIG. 3B illustrates a control method in which the current gear position of the transmission 108 is switched from a second running step D2 to the reverse R, and FIG. 3C illustrates a control method in which the current gear position of the transmission 108 is switched from a third running step D3 to the reverse R.

In the flowcharts in FIG. 3A, FIG. 3B and FIG. 3C, 'D1' indicates that the gear position of the transmission 108 is in a first running step, 'D2' indicates that the gear position of the transmission 108 is in a second running step, and 'D3 or more' indicates that the gear position of the transmission 108 is in a third running step or more. When a driver shifts the shift lever to the drive D, the switching to the first running step D1, the second running step D2, the third running step D3, and the like is automatically performed inside the transmission 108 by the control of the controller 150 in accordance with the running condition of the vehicle.

First, in illustrated in FIG. 3A, the following control is performed to switch from a state in which the current gear position of the transmission 108 is the first running step D1 to the reverse R.

The controller 150 confirms whether the driver shifts the shift lever from the drive D to the neutral N (302). Since the shift lever is switched to the order of the parking P->the reverse R->the neutral N->the drive D (or vice versa), for the driver to shift the shift lever from the drive D to the reverse R, the shift lever necessarily must pass through the neutral N.

When the shift lever is switched from the drive D to the neutral N ('YES' in 302), the controller 150 confirms whether the gear step of the existing drive D (the gear step immediately before being switched to the neutral N) is the first running step D1 (304).

If the gear step of the existing drive D is not the first running step D1 ('NO' in 304), the process proceeds to 332 in FIG. 3B, which will be described later.

If the gear step of the existing drive D is the first running step D1 ('YES' in 304), the controller unit 150 releases the odd-step clutch 202 of the transmission 108 to switch the transmission 108 to the neutral N, and performs the speed control so that the speed of the motor 104 reaches a first-step target RPM (306).

The first-step target RPM may be determined by <vehicle speed*gear ratio>. Alternatively, the first-step target RPM may be determined by obtaining the maximum RPM of the RPM section in which no shift shock occurs through experiments.

If the speed of the motor 104 does not decrease below the first-step target RPM ('NO' in 308), the controller 150 continues to perform the motor speed control to reduce the speed of the motor 104 (310).

In a state in which the speed of the motor 104 decreases to less than the first-step target RPM ('YES' in 308), when the driver shifts the shift lever from the neutral N to the reverse R ('YES' in 312), the controller 150 controls to engage the 1st-step gear '1' of the odd-step gears 222 of the transmission 108 with the odd-step clutch 202 and to apply a reverse torque of the motor 104 to the transmission 108 through the crankshaft 282, so that a reverse travel of the vehicle is performed (314).

As illustrated in FIG. 3B, to switch from the state in which the current gear position of the transmission 108 is the second running step D2 to the reverse R, the following control is performed.

In the foregoing description with reference to FIG. 3A, it has been mentioned that when the driver shifts the shift lever from the drive D to the neutral N ('YES' in 302) and the gear step of the existing drive D is not the first running step D1 ('NO' in 304), the process proceeds to 332 in FIG. 3B.

If the driver shifts the shift lever from the drive D to the neutral N ('YES' in 302 of FIG. 3A) and the gear step of the existing drive D is not the first running step D ('NO' in 304 of FIG. 3A), the controller 150 confirms whether the gear step of the existing drive D (the gear step immediately before being switched to the neutral N) is the second running step D2 (332).

If the gear step of the existing drive D is not the second running step D2 ('NO' in 332), the process proceeds to 362 in FIG. 3C, which will be described later.

If the gear step of the existing drive D is the second running step D2 ('YES' in 332), the controller 150 releases the even-step clutch 232 of the transmission 108 and the 2nd-step gear '2' of the even-step gears 252 to switch the transmission 108 to the neutral N (334).

As such, the controller 150 confirms the slope of the vehicle in a longitudinal direction (336). Since the shift control of FIG. 3A, FIG. 3B and FIG. 3C is for the reverse travel of the vehicle and the existing gear step is the second running step D2, it is desirable to implement the reverse travel with a more suitable one of the first-step gear and the second-step gear depending on an inclination of a road on which the vehicle is traveling. Accordingly, the inclination of the road is confirmed through the slope of the vehicle in the longitudinal direction thereof. In FIG. 3B, a reference value B (%) for determining the slope of the vehicle may be the maximum slope at which the vehicle may travel with the second gear ratio of the transmission 108.

Accordingly, if the slope of the vehicle (that is, the inclination of the road) is equal to or greater than the reference value B (%) ('NO' in 336), the controller 150 determines that 2nd-speed shifting is necessary for the reverse travel, and performs the speed control so that the speed of the motor 104 reaches a second-step target RPM for the 2nd-speed shifting (338).

On the other hand, if the slope of the vehicle (that is, the inclination of the road) is less than the reference value B (%) ('YES' in 336), the controller 150 determines that 1st-speed shifting is necessary for the reverse travel, and performs the speed control so that the speed of the motor 104 reaches the first-step target RPM for the 1st-speed shifting (340).

The first-step target RPM and the second-step target RPM may be determined by <vehicle speed*gear ratio>. Alternatively, the first-step target RPM and the second-step target RPM may be determined by obtaining the maximum RPM of the RPM section in which no shift shock occurs through experiments.

If the speed of the motor 104 does not decrease below the target RPM ('NO' in 342), the controller 150 continues to perform the motor speed control to reduce the speed of the motor 104 (344). The target RPM may be selected as any one of the first-step target RPM and the second-step target RPM depending on the inclination of the road.

In a state in which the speed of the motor 104 decreases to less than the target RPM ('YES' in 342), when the driver shifts the shift lever from the neutral N to the reverse R ('YES' in 346), the controller 150 controls to engage the 1st-step gear '1' of the odd-step gears 222 with the odd-step clutch 202 or the 2nd-step gear '2' of the even-step gears 252 with the even-step clutch 232 and to apply a reverse torque of the motor 104 to the transmission 108 through the crankshaft 282, so that the reverse travel of the vehicle is performed. The engagement of the clutch of the transmission 108 may also be selected as any one of the 1st-step gear '1' of the odd-step gears 222 and the 2nd-step gear '2' of the even-step gears 252 depending on the inclination of the road.

That is, in the case where the gear step of the existing drive D is the first step as in the case of the foregoing description with reference to FIG. 3A, the first-step gear may also be used in the reverse R without considering the inclination of the road. However, in the case where the gear step of the existing drive D is the second step as in the case of FIG. 3B, since it is necessary to determine whether the reverse R is to be performed in the first step or in the second step, it is preferable to select any one of the first step and the second step in consideration of the inclination of the road, to apply the target RPM to match the selected gear step, and to perform the rearward travel.

As illustrated in FIG. 3C, to switch from the state in which the current gear position of the transmission 108 is the third running step D3 or more to the reverse R, the following control is performed.

In the foregoing description with reference to FIG. 3B, it has been mentioned that the process proceeds to 362 in FIG. 3C when the gear step of the existing drive D is not the second running step D2 ('NO' in 332).

If the driver shifts the shift lever from the drive D to the neutral N ('YES' in 302 of FIG. 3A), the gear step of the existing drive D is not the first running step D1 ('NO' in 304 of FIG. 3A), and the gear step of the existing drive D is not the second running step D2 ('NO' in 332 of FIG. 3B), the controller 150 confirms whether the gear step of the existing drive D (the gear step immediately before being switched to the neutral N) is the third running step D3 or more (362).

If the gear step of the existing drive D is not the third running step D3 or more ('NO' in 362), the gear step of the existing drive D corresponds to the first running step D1 or the second running step D2 already described with reference to FIG. 3A and FIG. 3B, and thus the control illustrated in FIG. 3A or 3B is performed.

If the gear step of the existing drive D is the third running step D3 or more ('YES' in 362), the controller 150 releases the odd-step and even-step clutches 202 and 232 of the transmission 108 and the corresponding gear to switch the transmission 108 to the neutral N (364).

If the driver shifts the shift lever from the neutral N to the reverse R ('YES' in 366), the controller 150 confirms the speed of the vehicle and decelerates so that the speed of the vehicle reaches a predetermined reference speed C kph (368). Since it is preferable to carry the vehicle backward at a low speed for safety, the 1st-step gear '1' or the 2nd-step gear '2' is mainly used. Since it may be expected that the vehicle is running at a greater speed than the speed suitable for the backward traveling if the gear step of the existing drive D is in the third running step D3 or more, the speed of the vehicle decelerates to less than the predetermined reference speed C kph at which the backward traveling is possible.

When the speed of the vehicle decelerates to less than the predetermined reference speed C kph at which the backward traveling is possible, the controller 150 performs speed control so that the speed of the motor 104 reaches the second-step target RPM for 2-speed shifting (370).

If the speed of the motor 104 does not decrease below the second-step target RPM ('NO' in 372), the controller 150 continues to perform the motor speed control to decrease the speed of the motor 104 (374).

When the speed of the motor 104 decreases below the second-step target RPM ('YES' in 372), the controller 150 connects the even-step clutch 232 to the even-step gears 252 and applies a reverse torque of the motor 104 to the transmission 108 to perform the backward traveling of the vehicle.

Figure 4A:
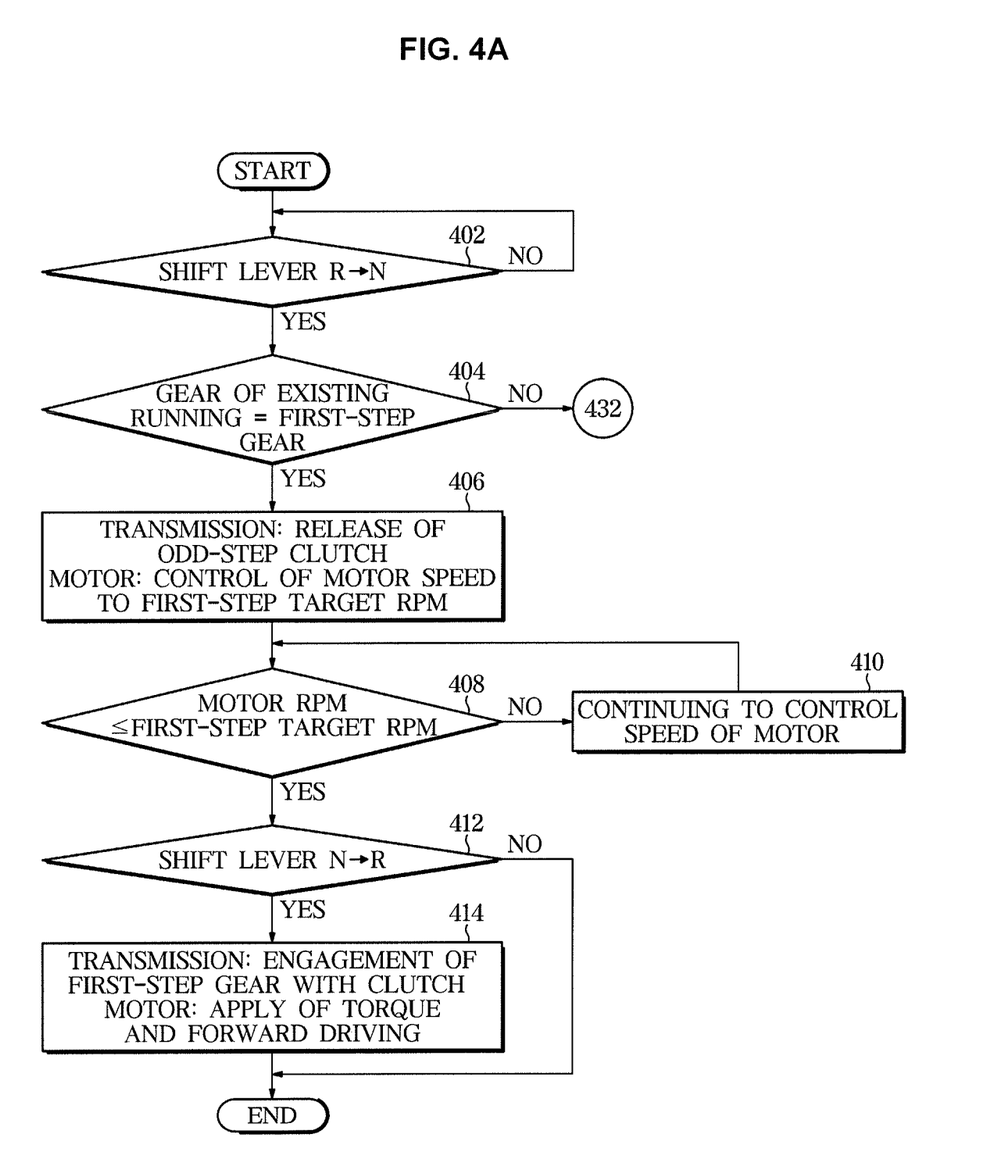
FIG. 4A and FIG. 4B are flowcharts illustrating control methods for a forward shift of a vehicle according to an exemplary embodiment of the present invention.
Figure 4B:
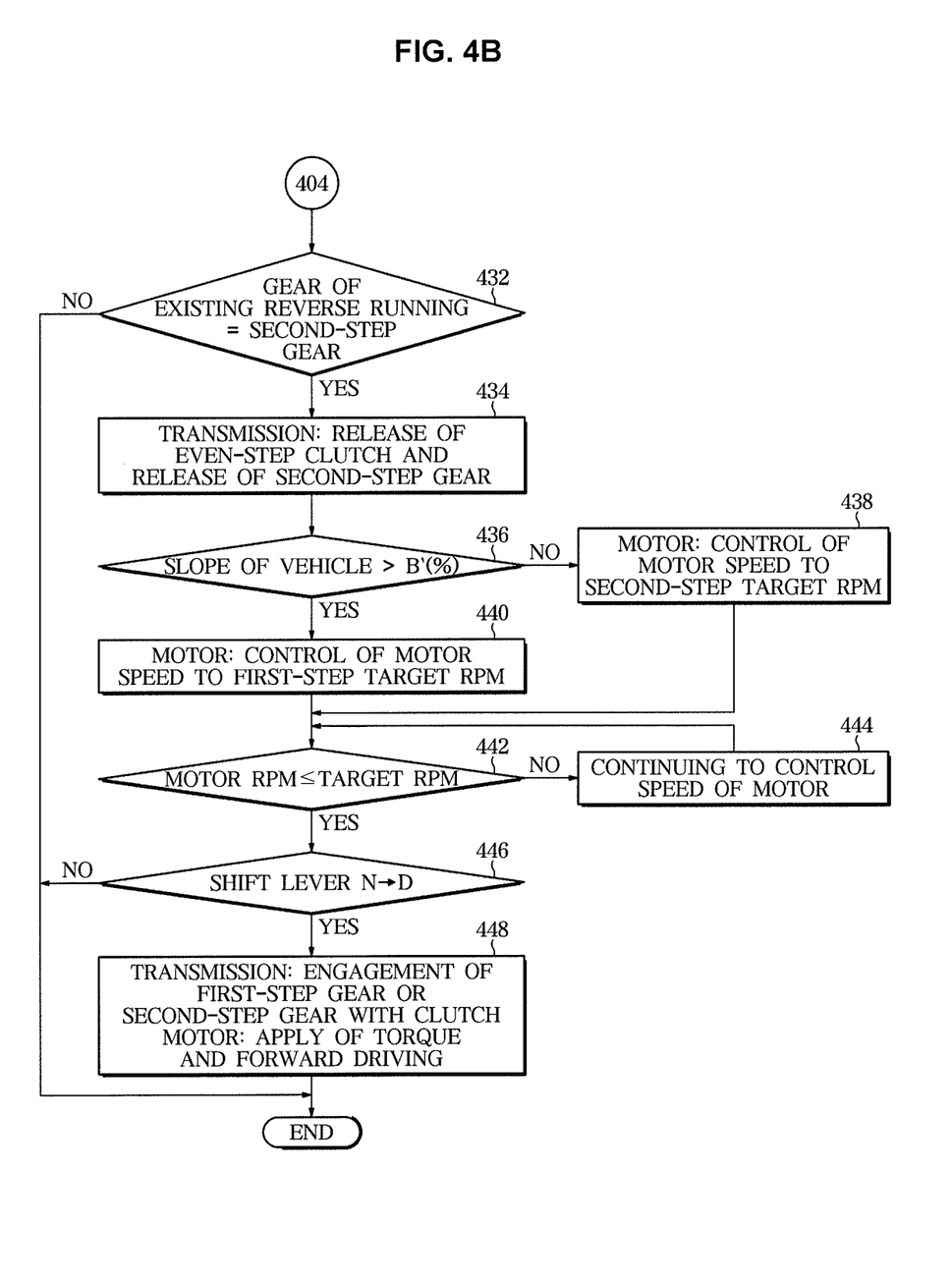

FIG. 4A and FIG. 4B are flowcharts illustrating control methods for a forward shift of a vehicle according to an exemplary embodiment of the present invention. That is, FIG. 4A and FIG. 4B illustrate control methods of switching the transmission 108 of the vehicle according to an exemplary embodiment of the present invention from the reverse R to the drive D FIG. 4A illustrates a control method in which the current gear position of the transmission 108 is switched from a first reverse step R1 to the drive D, and FIG. 4B illustrates a control method in which the current gear position of the transmission 108 is switched from a second reverse step R2 to the drive D.

In the flowcharts in FIG. 4A and FIG. 4B, 'R1' indicates that the gear position of the transmission 108 is in the first reverse step, and 'R2' indicates that the gear position of the transmission 108 is in the second reverse step. When the driver shifts the shift lever to the reverse R, the switching to the first reverse step R1, the second reverse step R2, and the like is automatically performed inside the transmission 108 by the control of the controller 150 in accordance with the running condition of the vehicle.

First, in illustrated in FIG. 4A, the following control is performed to switch from a state in which the current gear position of the transmission 108 in the first reverse step R1 to the drive D.

The controller 150 confirms whether the driver shifts the shift lever from the reverse R to the neutral N (402). Since the shift lever is switched to the order of the parking P−>the reverse R−>the neutral N−>the drive D (or vice versa), for the driver to shift the shift lever from the reverse R to the drive D, the shift lever may necessarily pass through the neutral N.

When the shift lever is switched from the reverse R to the neutral N ('YES' in 402), the controller 150 confirms whether the gear step of the existing reverse R (the gear step immediately before being switched to the neutral N) is the first reverse step R1 (404). Herein, the first reverse step R1 refers to the first gear which may be used both for the drive D and the reverse R, not for the separate gear for reverse.

If the gear step of the existing reverse R is not the first reverse step R1 ('NO' in 404), the process proceeds to 432 in FIG. 4B, which will be described later.

If the gear step of the existing reverse R is the first reverse step R1 ('YES' in 404), the controller unit 150 releases the odd-step clutch 202 of the transmission 108 to switch the transmission 108 to the neutral N, and performs the speed control so that the speed of the motor 104 reaches the first-step target RPM (406).

The first-step target RPM may be determined by <vehicle speed*gear ratio>. Alternatively, the first-step target RPM may be determined by obtaining the maximum RPM of the RPM section in which no shift shock occurs through experiments.

If the speed of the motor 104 does not decrease below the first-step target RPM ('NO' in 408), the controller 150 continues to perform the motor speed control to reduce the speed of the motor 104 (410).

In a state in which the speed of the motor 104 decreases to less than the first-step target RPM ('YES' in 408), when the driver shifts the shift lever from the neutral N to the drive D ('YES' in 412), the controller 150 controls to engage the 1st-step gear '1' of the odd-step gears 222 of the transmission 108 with the odd-step clutch 202 and to apply a forward torque of the motor 104 to the transmission 108 through the crankshaft 282, so that a forward travel of the vehicle is performed (414).

As illustrated in FIG. 4B, to switch from the state in which the current gear position of the transmission 108 is the second reverse step R2 to the drive D, the following control is performed.

In the foregoing description with reference to FIG. 4A, it has been mentioned that when the driver shifts the shift lever from the reverse R to the neutral N ('YES' in 402) and the gear step of the existing reverse R is not the first reverse step R1 ('NO' in 404), the process proceeds to 432 in FIG. 4B.

If the driver shifts the shift lever from the reverse R to the neutral N ('YES' in 402 of FIG. 4A) and the gear step of the existing reverse R is not the first reverse step R1 ('NO' in 404 of FIG. 4A), the controller 150 confirms whether the gear step of the existing reverse R (the gear step immediately before being switched to the neutral N) is the second reverse step R2 (432).

If the gear step of the existing reverse R is not the second reverse step R2 ('NO' in 432), the controller 150 ends the shift control.

If the gear step of the existing reverse R is the second reverse step R2 ('YES' in 432), the controller 150 releases the even-step clutch 232 of the transmission 108 and the 2nd-step gear '2' of the even-step gears 252 to switch the transmission 108 to the neutral N (434).

As such, the controller 150 confirms the slope of the vehicle in the longitudinal direction (436). Since the shift control of FIG. 4A and FIG. 4B is for the forward travel of the vehicle and the existing gear step is the second reverse step R2, it is desirable to implement the forward travel with a more suitable one of the first-step gear and the second-step gear depending on an inclination of a road on which the vehicle is traveling. Accordingly, the inclination of the road is confirmed through the slope of the vehicle in the longitudinal direction thereof. In FIG. 4B, a reference value B' (%) for determining the slope of the vehicle may be the maximum slope at which the vehicle may travel with the second gear ratio of the transmission 108.

Accordingly, if the slope of the vehicle (that is, the inclination of the road) is equal to or less than the reference value B' (%) ('NO' in 436), the controller 150 determines that 2nd-speed shifting is necessary for the forward travel, and performs the speed control so that the speed of the motor 104 reaches the second-step target RPM for the 2nd-speed shifting (438).

On the other hand, if the slope of the vehicle (that is, the inclination of the road) exceeds the reference value B' (%) ('YES' in 436), the controller 150 determines that 1st-speed shifting is necessary for the forward travel, and performs the speed control so that the speed of the motor 104 reaches the first-step target RPM for the 1st-speed shifting (440).

The first-step target RPM and the second-step target RPM may be determined by <vehicle speed*gear ratio>. Alternatively, the first-step target RPM and the second-step target RPM may be determined by obtaining the maximum RPM of the RPM section in which no shift shock occurs through experiments.

If the speed of the motor 104 does not decrease below the target RPM ('NO' in 442), the controller 150 continues to perform the motor speed control to reduce the speed of the motor 104 (444). The target RPM may be selected as any one of the first-step target RPM and the second-step target RPM depending on the inclination of the road.

In a state in which the speed of the motor 104 decreases to less than the target RPM ('YES' in 442), when the driver shifts the shift lever from the neutral N to the drive D ('YES' in 446), the controller 150 controls to engage the 1st-step gear '1' of the odd-step gears 222 with the odd-step clutch 202 or the 2nd-step gear '2' of the even-step gears 252 with the even-step clutch 232 and to apply a forward torque of the motor 104 to the transmission 108 through the crankshaft 282, so that the forward travel of the vehicle is performed. The engagement of the clutch of the transmission 108 may also be selected as any one of the 1st-step gear '1' of the odd-step gears 222 and the 2nd-step gear '2' of the even-step gears 252 depending on the inclination of the road.

That is, in the case where the gear step of the existing drive D is the first step as in the case of the foregoing description with reference to FIG. 4A, the first-step gear may also be used in the drive D without considering the inclination of the road. However, in the case where the gear step of the existing reverse R is the second step as in the case of FIG. 4B, since it is necessary to determine whether the drive D is to be performed in the first step or in the second step, it is preferable to select any one of the first step and the second step in consideration of the inclination of the road and to apply the target RPM to match the selected gear step.

As is apparent from the above, a hybrid vehicle and a transmission control method according to an exemplary embodiment of the present invention can implement a rearward travel through the reverse rotation of a motor without a separate reverse gear and perform appropriate shift control in consideration of the current gear position of the transmission at the time of shifting from the drive D to the reverse R or from the reverse R to the drive D.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A transmission control method of a hybrid vehicle provided with a transmission having no reverse gear, the transmission control method comprising:
   performing a speed control of a motor with a target revolutions per minute (RPM) corresponding to an existing gear step when a shift lever is switched from a drive D to a neutral N; and
   performing a backward travel with the existing gear step by engaging a gear of the existing gear step with a clutch and applying a reverse torque of the motor to the transmission when the shift lever is switched from the neutral N to a reverse R.

2. The transmission control method according to claim 1, wherein when the existing gear step is a first step, a speed of the motor is controlled to a first-step target RPM.

3. The transmission control method according to claim 1, wherein when the existing gear step is a second step, a speed of the motor is controlled to one of the first-step target RPM and a second-step target RPM depending on an inclination of a road on which the vehicle is traveling.

4. The transmission control method according to claim 3, wherein when the inclination of the road is less than a predetermined reference value, the speed of the motor is controlled to a first-step target RPM; and
   wherein when the inclination of the road is equal to or greater than the predetermined reference value, the speed of the motor is controlled to the second-step target RPM.

5. The transmission control method according to claim 4, wherein the predetermined reference value of the inclination is a maximum inclination at which the vehicle is configured for traveling with a second gear ratio of the transmission.

6. The transmission control method according to claim 1, wherein when the existing gear step is a third step or more, a speed of the motor is controlled after a vehicle speed is reduced below a predetermined reference value.

7. The transmission control method according to claim 6, wherein when the existing gear step is the third step or more, the speed of the motor is controlled to a second-step target RPM.

8. The transmission control method according to claim 1, wherein the transmission is a dual clutch transmission including an odd-step transmission clutch and an even-step transmission clutch;
   wherein the existing gear step is connected to the odd-step transmission clutch when the existing gear step is an odd-numbered step; and
   wherein the existing gear step is connected to the even-step transmission clutch when the existing gear step is an even-numbered step.

9. A transmission control method of a hybrid vehicle provided with a transmission having no reverse gear, the transmission control method comprising:
   performing a speed control of a motor with a target revolutions per minute (RPM) corresponding to an existing gear step when a shift lever is switched from a reverse R to a neutral N; and
   performing a forward travel with the existing gear step by engaging a gear of the existing gear step with a clutch and applying a torque of the motor to the transmission when the shift lever is switched from the neutral N to a drive D.

10. The transmission control method according to claim 9, wherein, when the existing gear step is a first step, a speed of the motor is controlled to a first-step target RPM.

11. The transmission control method according to claim 9, wherein, when the existing gear step is a second step, a speed of the motor is controlled to one of the first-step target RPM and a second-step target RPM depending on an inclination of a road on which the vehicle is traveling.

12. The transmission control method according to claim 11, wherein, when the inclination of the road exceeds a predetermined reference value, the speed of the motor is controlled to a first-step target RPM; and
   wherein, when the inclination of the road is equal to or less than the predetermined reference value, the speed of the motor is controlled to the second-step target RPM.

13. The transmission control method according to claim 12, wherein the predetermined reference value of the inclination is a maximum inclination at which the vehicle is configured for traveling with a second gear ratio of the transmission.

14. The transmission control method according to claim 9,
wherein the transmission is a dual clutch transmission including an odd-step transmission clutch and an even-step transmission clutch;
wherein the existing gear step is connected to the odd-step transmission clutch when the existing gear step is an odd-numbered step; and
wherein the existing gear step is connected to the even-step transmission clutch when the existing gear step is an even-numbered step.

15. A hybrid vehicle comprising:
a transmission having no reverse gear; and
a controller configured of performing a speed control of a motor with a target revolutions per minute (RPM) corresponding to an existing gear step when a shift lever is switched from a drive D to a neutral N and configured of performing a backward travel with the existing gear step by engaging a gear of the existing gear step with a clutch and applying a reverse torque of the motor to the transmission when the shift lever is switched from the neutral N to a reverse R.

16. The hybrid vehicle according to claim 15,
wherein the controller is configured to control a speed of the motor to one of a first-step target RPM and a second-step target RPM depending on an inclination of a road on which the vehicle travels when the existing gear step is a second step.

17. The hybrid vehicle according to claim 16,
wherein the controller is configured to control the speed of the motor to the first-step target RPM when the inclination of the road is less than a predetermined reference value and is configured to control the speed of the motor to the second-step target RPM when the inclination of the road is equal to or greater than the predetermined reference value.

18. The hybrid vehicle according to claim 17,
wherein the predetermined reference value of the inclination is a maximum inclination at which the vehicle is configured for traveling with a second gear ratio of the transmission.

19. A hybrid vehicle comprising:
a transmission having no reverse gear; and
a controller configured of performing a speed control of a motor with a target revolutions per minute (RPM) corresponding to an existing gear step when a shift lever is switched from a reverse R to a neutral N and to perform a forward travel with the existing gear step by engaging a gear of the existing gear step with a clutch and applying a torque of the motor to the transmission when the shift lever is switched from the neutral N to a drive D.

20. The hybrid vehicle according to claim 19,
wherein the controller is configured to control a speed of the motor to one of a first-step target RPM and a second-step target RPM depending on an inclination of a road on which the vehicle travels when the existing gear step is a second step.

* * * * *